United States Patent
Lee et al.

(10) Patent No.: US 9,143,757 B2
(45) Date of Patent: Sep. 22, 2015

(54) METHOD AND APPARATUS FOR TRANSMITTING AND RECEIVING STEREOSCOPIC VIDEO

(75) Inventors: Gwang Soon Lee, Daejeon (KR); Chan Kim, Daejeon (KR); Kug Jin Yun, Daejeon (KR); Hong Chang Shin, Seoul (KR); Won Sik Cheong, Daejeon (KR); Nam Ho Hur, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 662 days.

(21) Appl. No.: 13/455,089

(22) Filed: Apr. 24, 2012

(65) Prior Publication Data
US 2012/0274741 A1 Nov. 1, 2012

(30) Foreign Application Priority Data

Apr. 27, 2011 (KR) .......................... 10-2011-0039674
Mar. 30, 2012 (KR) .......................... 10-2012-0032902

(51) Int. Cl.
 *H04N 13/02* (2006.01)
 *H04N 13/00* (2006.01)
(52) U.S. Cl.
 CPC ....... *H04N 13/0048* (2013.01); *H04N 13/0029* (2013.01)
(58) Field of Classification Search
 CPC .......... H04N 13/0048; H04N 13/0059; H04N 21/234327; H04N 13/0003
 USPC ........................... 348/43; 375/240.01–240.27
 See application file for complete search history.

(56) References Cited

U.S. PATENT DOCUMENTS

| | | | | |
|---|---|---|---|---|
| 2003/0202592 A1* | 10/2003 | Sohn et al. | ............... | 375/240.16 |
| 2006/0262846 A1* | 11/2006 | Burazerovic et al. | ...... | 375/240.2 |
| 2008/0303892 A1* | 12/2008 | Kim et al. | ........................ | 348/42 |
| 2009/0092335 A1* | 4/2009 | Kim et al. | ..................... | 382/285 |
| 2010/0110163 A1* | 5/2010 | Bruls et al. | ...................... | 348/43 |

FOREIGN PATENT DOCUMENTS

| KR | 1020050055163 A | 6/2005 |
|---|---|---|
| KR | 1020100013419 A | 2/2010 |

* cited by examiner

*Primary Examiner* — Andy Rao
*Assistant Examiner* — Jared Walker
(74) *Attorney, Agent, or Firm* — William Park & Associates Ltd.

(57) ABSTRACT

A method of receiving stereoscopic video according to the present invention includes receiving a bit stream including image information, extracting a base image stream corresponding to a base image and an additional image stream corresponding to an additional image from the bit stream, generating the base image and the additional image by decoding the base image stream and the additional image stream, respectively, and generating a left image and a right image by using at least one of the base image and the additional image. According to the present invention, 2D/3D broadcasting service efficiency may be improved.

16 Claims, 9 Drawing Sheets

METHOD AND APPARATUS FOR TRANSMITTING AND RECEIVING STEREOSCOPIC VIDEO

Priority to Korean patent application numbers 10-2011-0039674 filed on Apr. 27, 2011 and 10-2012-0032902 filed on Mar. 30, 2012, the entire disclosure of which are incorporated by reference herein, is claimed.

BACKGROUND OF THE INVENTION

1. Field of the Invention

The present invention relates to digital broadcasting and, more particularly, to a method and apparatus for transmitting and receiving stereoscopic video.

2. Discussion of the Related Art

Digital broadcasting service using a 3D image, together with UDTV service, has been in the spotlight as the next-generation broadcasting service subsequent to HDTV. It is expected that 3DTV service, enabling a user to enjoy a 3D image in each home, may be provided in a few years on the basis of the development of relevant technologies, such as the launch of a commercial stereoscopic display having a high picture quality.

3D broadcasting service now being commercially served or served as a model chiefly uses stereoscopic video composed of a left image and a right image. A frame-compatible method of forming left/right images into one screen using a format, such as a side-by-side format or a top-and-bottom format, coding the image screen, and transmitting the coded data, a service-compatible method of separately coding left/right images and transmitting the coded data, and so on may also be used as the stereoscopic video service method.

SUMMARY OF THE INVENTION

An object of the present invention is to provide a method and apparatus for transmitting stereoscopic video, which are capable of improving 2D/3D broadcasting service efficiency.

Another object of the present invention is to provide a method and apparatus for receiving stereoscopic video, which are capable of improving 2D/3D broadcasting service efficiency.

Yet another object of the present invention is to provide a method and apparatus for providing 3DTV service, which are capable of improving 2D/3D broadcasting service efficiency.

1. An embodiment of the present invention relates to a method of transmitting stereoscopic video. The method includes generating a base image and an additional image using a left image and a right image, generating a base image stream, corresponding to the base image, and an additional image stream, corresponding to the additional image, by coding the base image and the additional image, respectively, generating single stream information by multiplexing the base image stream and the additional image stream, and transmitting image information including the single stream information, wherein the additional image includes a reduced left image corresponding to the left image and a reduced right image corresponding to the right image based on a predetermined image format.

2. In 1, the predetermined image format may be a side-by-side format or a top-and-bottom format.

3. In 1, generating the base image stream corresponding to the base image and the additional image stream corresponding to the additional image may include coding the reduced left image and the reduced right image at different bit rates.

4. In 3, if a service type of the stereoscopic video is service-compatible service, the base image is one of the left image and the right image, and generating the base image stream corresponding to the base image and the additional image stream corresponding to the additional image may include coding one image not corresponding to the base image, from among the reduced left image and the reduced right image, at a higher bit rate than the other image.

5. In 1, if a service type of the stereoscopic video is frame-compatible service, the base image and the additional image may have different pieces of content.

6. In 1, the method may further include generating signaling information, including at least one of stereoscopic service type information indicating a service type of the stereoscopic video, image format type information indicating an image format type of the additional image, and information indicating whether the base image is the left image or the right image, wherein the image information may further include the signaling information.

7. Another embodiment of the present invention relates to an apparatus for transmitting stereoscopic video. The apparatus includes an image format processing unit for generating a base image and an additional image using a left image and a right image, a coder for generating a base image stream, corresponding to the base image, and an additional image stream, corresponding to the additional image, by coding the base image and the additional image, respectively, a multiplexer for generating single stream information by multiplexing the base image stream and the additional image stream, and a transmitter for transmitting image information including the single stream information, wherein the additional image includes a reduced left image corresponding to the left image and a reduced right imagecorresponding to the right image based on a predetermined image format.

8. Yet another embodiment of the present invention relates to a method of receiving stereoscopic video. The method includes receiving a bit stream including image information, extracting a base image stream corresponding to a base image and an additional image stream corresponding to an additional image from the bit stream, generating the base image and the additional image by decoding the base image stream and the additional image stream, respectively, and generating a left image and a right image by using at least one of the base image and the additional image, wherein the additional image includes a reduced left image corresponding to the left image and a reduced right image corresponding to the right image based on a predetermined image format.

9. In 8, the predetermined image format may be a side-by-side format or a top-and-bottom format.

10. In 8, the additional image stream may include a first partial stream corresponding to the reduced left image and a second partial stream corresponding to the reduced right image, and generating the base image and the additional image may include decoding the first partial stream and the second partial stream at different bit rates.

11. In 10, if a service type of the stereoscopic video is service-compatible service, the base image may be one of the left image and the right image, and generating the base image and the additional image may include decoding a partial stream not corresponding to the base image, from among the first partial stream and the second partial stream, at a higher bit rate than the other partial stream.

12. In 11, generating the left image and the right image may include generating the left image using the base image and generating the right image by enlarging the reduced right image, if the base image is the left image.

13. In 11, generating the left image and the right image may include generating the right image using the base image and generating the left image by enlarging the reduced left image, if the base image is the right image.

14. In 8, if a service type of the stereoscopic video is frame-compatible service, generating the left image and the right image may include generating the left image by enlarging the reduced left image and generating the right image by enlarging the reduced right image.

15. In 14, the base image and the additional image may have different pieces of content.

16. In 8, the method may further include obtaining signaling information, including at least one of stereoscopic service type information indicating a service type of the stereoscopic video, image format type information indicating an image format type of the additional image, and information indicating whether the base image is the left image or the right image, from the bit stream, wherein the image information may further include the signaling information.

17. Further yet another embodiment of the present invention relates to an apparatus for receiving stereoscopic video. The apparatus includes a receiver for receiving a bit stream including image information, a demultiplexing unit for extracting a base image stream corresponding to a base image and an additional image stream corresponding to an additional image from the bit stream, a decoder for generating the base image and the additional image by decoding the base image stream and the additional image stream, respectively, and an image rendering unit for generating a left image and a right image by using at least one of the base image and the additional image, wherein the additional image includes a reduced left image corresponding to the left image and a reduced right image corresponding to the right image based on a predetermined image format.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

DETAILED DESCRIPTION OF THE EMBODIMENTS

Hereinafter, exemplary embodiments are described in detail with reference to the accompanying drawings. In describing the embodiments of the present invention, a detailed description of the known functions and constructions will be omitted if it is deemed to make the gist of the present invention unnecessarily vague.

If one element is described to be "connected" or "coupled" to the other element, the one element may be directly connected or coupled to the other element, but it should be understood that a third element may exist between the two elements. Furthermore, in the present invention, the contents describing that a specific element is "included (or comprised)" does not mean that elements other than the specific element are excluded, but means that additional elements may be included in the implementation of the present invention or in the scope of technical spirit of the present invention.

Terms, such as the first and the second, may be used to describe various elements, but the elements should not be restricted by the terms. The terms are used to only distinguish one element and the other element from each other. For example, a first element may be named a second element without departing from the scope of the present invention. Likewise, a second element may also be named a first element.

Furthermore, elements described in the embodiments of the present invention are independently shown in order to indicate different and characteristic functions, and it does not mean that each of the elements consists of separate hardware or one software unit. That is, the elements are arranged, for convenience of description, and at least two of the elements may be combined to form one element or one element may be divided into a plurality of elements and the plurality of elements may perform functions. An embodiment in which the elements are combined or each of the elements is divided into a plurality of elements is included in the scope of the present invention without departing from the essence of the present invention.

Furthermore, in the present invention, some elements may not be essential elements for performing essential functions, but may be optional elements for improving only performance. The present invention may be implemented using only the essential elements for implementing the essence of the present invention other than the elements for improving only performance, and a structure including only the essential elements other than the optional elements for improving only performance is included in the scope of the present invention.

Figure 1:
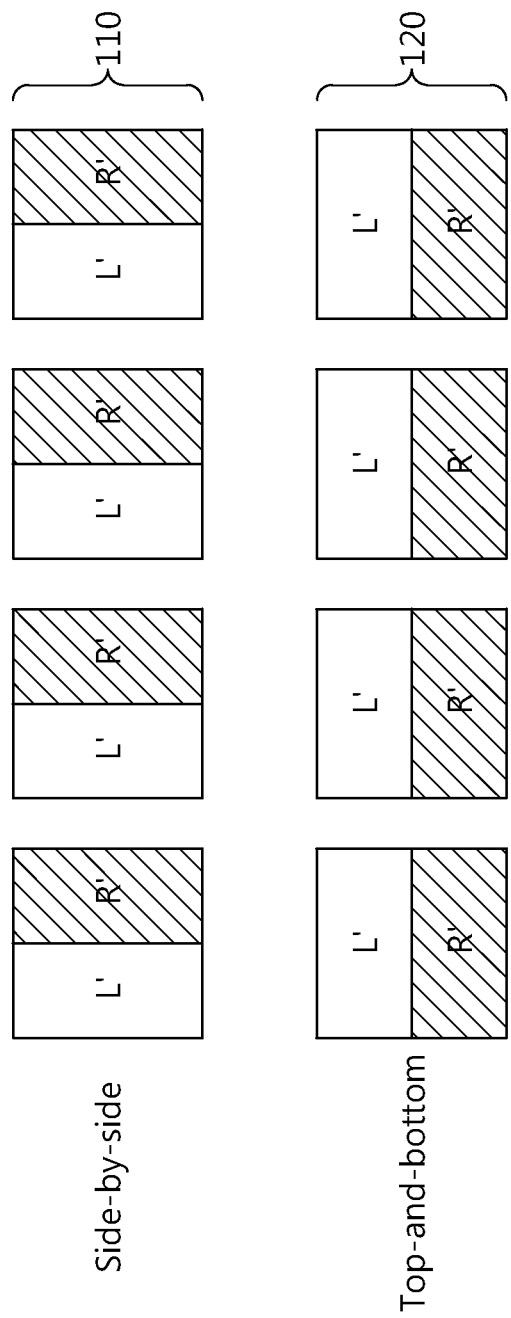
FIG. 1 is a conceptual diagram schematically illustrating an embodiment of an image format used for stereoscopic video service.

FIG. 1 is a conceptual diagram schematically illustrating an embodiment of an image format used for stereoscopic video service. In FIG. 1, 110 shows a side-by-side format, and 120 shows a top-and-bottom format.

The stereoscopic video service may include a variety of methods. For example, a frame-compatible method and a service-compatible method may be used for the stereoscopic video service.

The frame-compatible method is a stereoscopic video service method of coding, transmitting, and/or decoding a left image and a right image included in one frame. An image format used in 3DTV based on the frame-compatible method may have various formats. The image format may include, for example, the side-by-side format and the top-and-bottom format.

Referring to 110 of FIG. 1, if the side-by-side format is used, a left image reduced in a ½ size in a horizontal direction may be placed in the left region of a 3D image frame, and a right image reduced in a ½ size in the horizontal direction may be placed in the right region of the 3D image frame. If an original left image is called L and an original right image is called R, the left image reduced in the horizontal direction may be indicated by L', and the right image reduced in the horizontal direction may be indicated by R'. An order that the left image and the right image are arranged left and right is not limited to the above-described embodiment. For example, the horizontally reduced right image R' may be placed in the left region of the frame, and the horizontally reduced left image L' may be placed in the right region of the frame.

Referring to 120 of FIG. 1, if the top-and-bottom format is used, a left image reduced by a ½ size in a vertical direction may be placed in the upper region of a 3D image frame, and a right image reduced in a ½ size in the vertical direction may be placed in the lower region of the 3D image frame. If an original left image is called L and an original right image is called R, the left image reduced in the vertical direction may be indicated by L', and the right image reduced in the vertical direction may be indicated by R'. An order that the left image and the right image are arranged up and down is not limited to the above-described embodiment. For example, the vertically reduced right image R' may be placed in the upper region of the frame, and the vertically reduced left image L' may be placed in the lower region of the frame.

For frame-compatible 3DTV service, the side-by-side format and the top-and-bottom format are chiefly used as formats for 3DTV-dedicated broadcasting. The two formats, however, may be problematic in the guaranteed backward compatibility aspect. In the frame-compatible method, image information may be transmitted and received using the existing media, broadcasting equipment, and terminals used in the existing 2-Dimensional (2-D) broadcasting. That is, in the frame-compatible method, coding, transmission, and decoding may be performed using the existing 2D broadcasting system. If image information is received and played through the existing 2D terminal (e.g., the existing DTV receiver), however, a 2D image having the same format as that of the existing 2D broadcasting may not be played because a left image and a right image are played in one screen on halves at the same time. Furthermore, even when image information is coded, transmitted, and decoded through the 3D terminal, picture quality may be deteriorated when a 3D image is played because processes, such as reduction and interpolation, are performed.

Figure 2:
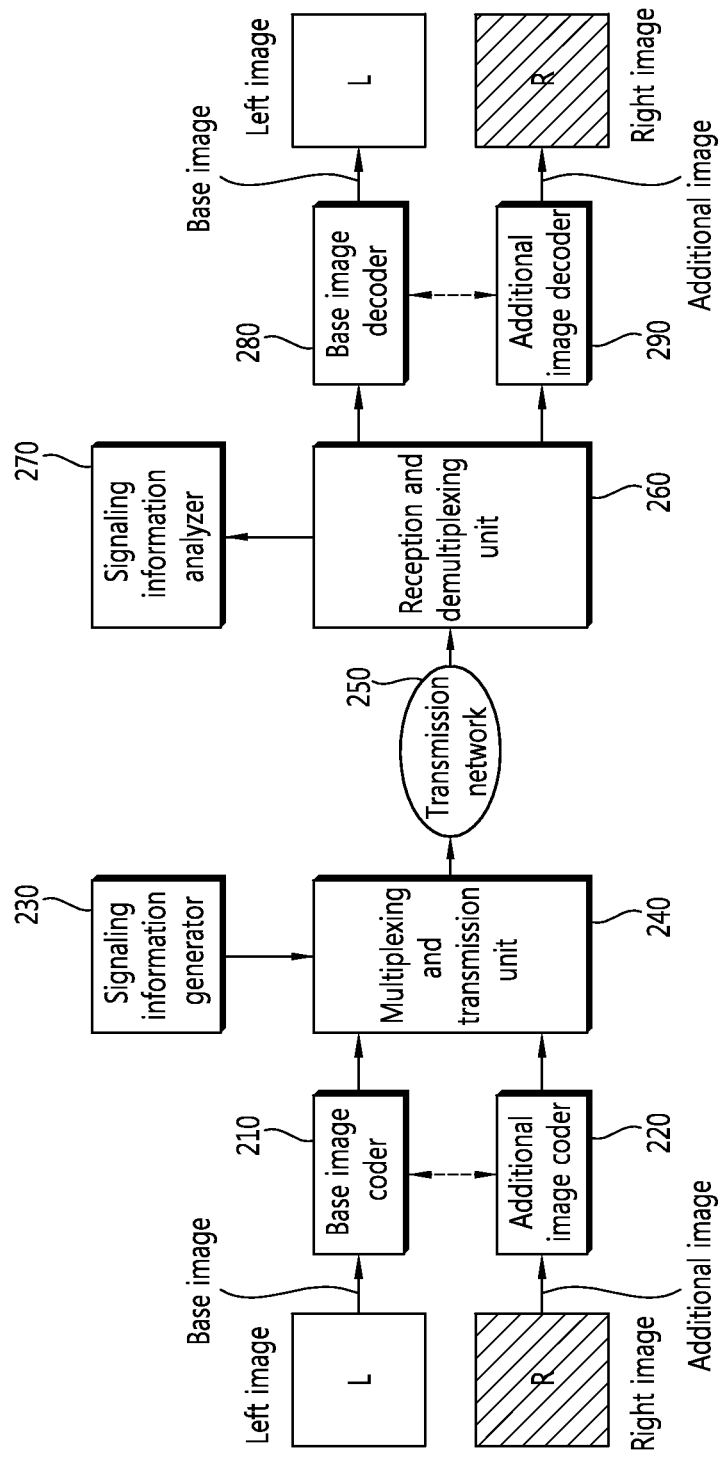
FIG. 2 is a block diagram schematically showing an embodiment of a service-compatible 3DTV broadcasting system based on a dual stream method.

FIG. 2 is a block diagram schematically showing an embodiment of a service-compatible 3DTV broadcasting system based on a dual stream method.

Referring to FIG. 2, the service-compatible 3DTV broadcasting system based on a dual stream method may include a stereoscopic video transmission apparatus, a transmission network 250, and a stereoscopic video reception apparatus. The apparatus for transmitting stereoscopic video may include a base image coder 210, an additional image coder 220, a signaling information generator 230, and a multiplexing and transmission unit 240. The apparatus for receiving stereoscopic video may include a reception and demultiplexing unit 260, a signaling information analyzer 270, a base image decoder 280, and an additional image decoder 290.

The service-compatible method is a stereoscopic video service method that enables 2D image, having the same format as that of the existing 2D broadcasting, to be watched even in the existing 2D terminal. For example, in the service-compatible method, an original left image and an original right image may be coded into separate dual streams and then transmitted. Accordingly, in the service-compatible method, a problem related to backward compatibility, occurring in the stereoscopic image format, can be fundamentally solved.

Referring to FIG. 2, one of a left image L and a right image R may be used as a base image, and the other of the left image L and the right image R may be used as an additional image. Here, the base image may mean an image having compatibility with the existing 2D image, and a coding method used in the existing 2D broadcasting may be used for the base image. The additional image may mean an image that forms a pair or set with the base image in order to construct a stereoscopic video image. For example, if the left image L is used as the base image, the right image R, a depth image, and a disparity image corresponding to the base image may correspond to the additional image.

The base image coder 210 may be a common video coder for coding the base image. More specifically, the base image coder 210 may generate a base image stream by coding the base image using a coding method used in the existing 2D broadcasting. The additional image coder 220 may generate an additional image stream by coding the additional image. Here, the additional image coder 220 may independently code the additional image or may code the additional image through a mutual reference with the base image coder 210. That is, in the service-compatible 3DTV broadcasting system of FIG. 2, an original left image and an original right image may be independently coded or may be coded through a mutual reference. In FIG. 2, a dotted line between the base image coder 210 and the additional image coder 220 may mean coding through a mutual reference.

The signaling information generator 230 may generate signaling information, including a type of 3DTV service, an image format of an additional image, information about whether a base image is a left image or a right image, and so on. The signaling information may be defined in a signaling table, and the signaling information may be included in a bit stream through the multiplexing and transmission unit 240 and then transmitted to the stereoscopic video reception apparatus. The signaling table may mean a PAT of Program Specific Information (PSI), a PMT of PSI, a VCT of a Program and System Information Protocol (PSIP) and/or an EIT of a PSIP.

The PSI may mean metadata, including information necessary to demultiplex a Transport Stream (TS) and reproduce an image in the form of a table. The apparatus for receiving stereoscopic video may refer to PSI information in order to determine a TS packet necessary to, for example, switch an Elementary Stream (ES) and select a channel.

In an embodiment, the PSI may include tables, such as a Program Association Table (PAT), a Conditional Access Table (CAT), a Program Map Table (PMT), and a Network Information Table (NIT). In particular, the PMT may include information about program elements that form one program and/or information about image streams that form image data within a program.

The PSIP is a protocol related to digital broadcasting and is a communication protocol that is used to transmit information about each channel of a TS. The PSIP may include a System Time Table (STT) for transferring time information, a Master Guide Table (MGT) for managing a transport table, a Virtual Channel Table (VCT) for providing virtual channel information, an Event Information Table (EIT) for providing program information, and so on. The PSIP may have a similar configuration as the PSI.

Signaling information included in a signaling table may be defined in the stream type stream_type and/or the descriptor of a PMT, may be defined in the stream type stream_type and/or the descriptor of a VCT, or may be defined in the descriptor of an EIT. For example, in accordance with 3DTV broadcasting standards that are now being standardized in Korea and abroad, such as TTA and MPEG, stereoscopic service type information may be defined in the descriptor loop of a PMT. The stereoscopic service type information may refer to information indicative of a service type of stereoscopic video that is now being served. For example, a specific value may be assigned to each of service types, such as monoscopic service, frame-compatible stereoscopic service, and service-compatible stereoscopic service. The stereoscopic service type information may indicate a value corresponding to a type of 3DTV broadcasting service that is now being provided, from among values assigned to the service types. For example, in order to indicate the stereo service type information, a field 'stereoscopic_service_type' may be defined in a descriptor. Furthermore, image format type information may be defined in a descriptor loop within a PMT. The image format type information may refer to information indicating an image format of an additional image. For example, a specific value may be assigned to each of a stereo side-by-side format, a stereo top-and-bottom format, and a 2D video format. The image format type information may indicate a value corresponding to a current image format, from among the assigned values. For example, in order to indicate the image format type information, a field 'stero_video_format_type' may be defined within a descriptor.

Referring back to FIG. 2, the multiplexing and transmission unit 240 may generate a single stream by multiplexing the coded base image stream and the coded additional image stream. The generated single stream may be subject to processes, such as channel coding and modulation, and then transmitted to the stereoscopic video reception apparatus over the transmission network 250.

The reception and demultiplexing unit 260 may receive a 3DTV signal (i.e., a bit stream) over the transmission network 250. The reception and demultiplexing unit 260 may extract the base image stream and the additional image stream by performing processes, such as demodulation, channel decoding, and demultiplexing, for the received bit stream.

The signaling information analyzer 270 may deduce signaling information from the bit stream received from the stereoscopic video transmission apparatus. A detailed embodiment of the signaling information has been described above, and thus a description of the signaling information is omitted.

The base image decoder 280 may generate a base image by decoding the base image stream extracted from the bit stream. Furthermore, the additional image decoder 290 may generate an additional image by decoding the additional image stream extracted from the bit stream. The additional image decoder 290 may independently decode the additional image stream or may decode the additional image stream through a mutual reference with the base image decoder 280. Here, one of the base image and the additional image may correspond to a left image L, and the other of the base image and the additional image may correspond to a right image R. For example, if the base image is a left image L, the left image L may correspond to a 2D image. The generated base image or the generated additional image or both may be provided to a 2D display device or a 3D display device.

A current frame-compatible 3DTV receiver to which the image format of FIG. 1 is applied is now being commercialized, but may have problems in the backward compatibility aspect. The service-compatible 3DTV broadcasting system may have backward compatibility with a 2D broadcasting system because the existing DTV terminal may configure a common screen by decoding only base image streams. However, the service-compatible 3DTV broadcasting system may have a problem in that it is difficult to be applied to service based on the frame-compatible method. For this reason, there is a need for a 3DTV service providing method of basically providing 2D service to the existing DTV, providing basic 3D service to 3DTV based on the frame-compatible method to which image formats, such as the side-by-side format and the top-and-bottom format, are applied, and providing 3D service of a high picture quality to service-compatible 3DTV based on the dual stream method at the same time. Accordingly, a 3DTV service providing method capable of supporting both service based on the service-compatible method and service based on the frame-compatible method and providing 3D service of a high picture quality may be provided through the service-compatible 3DTV broadcasting system based on a dual stream method.

Figure 3:
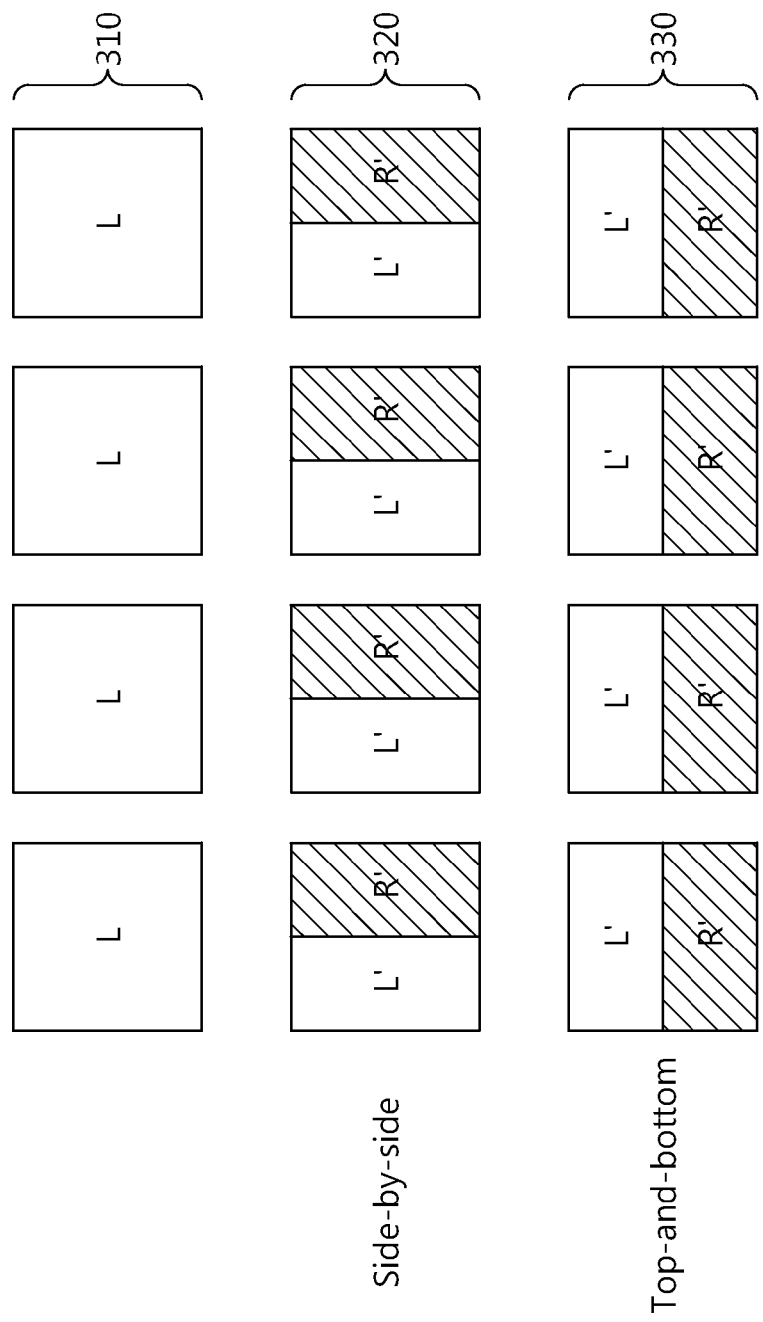
FIG. 3 is a conceptual diagram schematically illustrating a method of configuring a base image and an additional image according to the present invention.

FIG. 3 is a conceptual diagram schematically illustrating a method of configuring a base image and an additional image according to the present invention. In FIG. 3, 310 indicates a base image, and 320 and 330 indicate additional images.

In the service-compatible 3DTV broadcasting system based on the dual stream method of FIG. 2, a left image and a right image may maintain resolution of an original size. However, the service-compatible 3DTV broadcasting system of FIG. 2 may not have backward compatibility with a frame-compatible 3DTV receiver. In order for the service-compatible 3DTV broadcasting system to have backward compatibility with a 2D broadcasting receiver and a frame-compatible 3DTV receiver at the same time, a left image of an original size or a right image of an original size may be used as a base image, and an image format, such as the side-by-side format or the top-and-bottom format, may be used as an additional image.

Referring to FIG. 3, a base image may correspond to a left image L, 310 of an original size. A method of configuring a base image is not limited to the above embodiment, and a base image may correspond to a right image R of an original size.

An additional image may have one of various image formats used in the 3DTV broadcasting system based on the frame-compatible method. For example, the additional image may be an image 320 having the side-by-side format or an image 330 having the top-and-bottom format. Referring to 320 of FIG. 3, if the side-by-side format is used, a left image L' reduced in a ½ size in a horizontal direction may be placed in the left region of the 3D image frame, and a right image R' reduced in a ½ size in the horizontal direction may be placed in the right region of the 3D image frame. An order that the left image and the right image are arranged left and right is not limited to the above embodiment. For example, the horizontally reduced right image R' may be placed in the left region of the 3D image frame, and the horizontally reduced left image L' may be placed in the right region of the 3D image frame. Furthermore, referring to 330 of FIG. 3, if the top-and-bottom format is used, a left image L' reduced in a ½ size in a vertical direction may be placed in the upper region of a 3D image frame, and a right image R' reduced in a ½ size in the vertical direction may be placed in the lower region of the 3D image frame. An order that the left image and the right image are arranged up and down is not limited to the above embodiment. For example, the vertically reduced right image R' may be placed in the upper region of the 3D image frame, and the vertically reduced left image L' may be placed in the lower region of the 3D image frame.

The base image and the additional image may be composed of the same content or different pieces of content. Referring to FIG. 3, if the base image and the additional image have the same content, an original left image corresponding to the reduced left image L' of the additional image 320 or 330 may be identical with the original left image L of the base image. Furthermore, if the base image and the additional image have different pieces of content, an original left image corresponding to the reduced left image L' of the additional image 320 or 330 may differ from the original left image L of the base image. Here, the base image and the additional image having the same content may be used to provide high picture-quality 3DTV service, and the base image and the additional image having different pieces of content may be used to provide the variety of a program. For example, if the service type of stereoscopic video is service-compatible service, a base image and an additional image may have the same content. If the service type of stereoscopic video is monoscopic service or frame-compatible service, a base image and an additional image may have different pieces of content.

Figure 4:
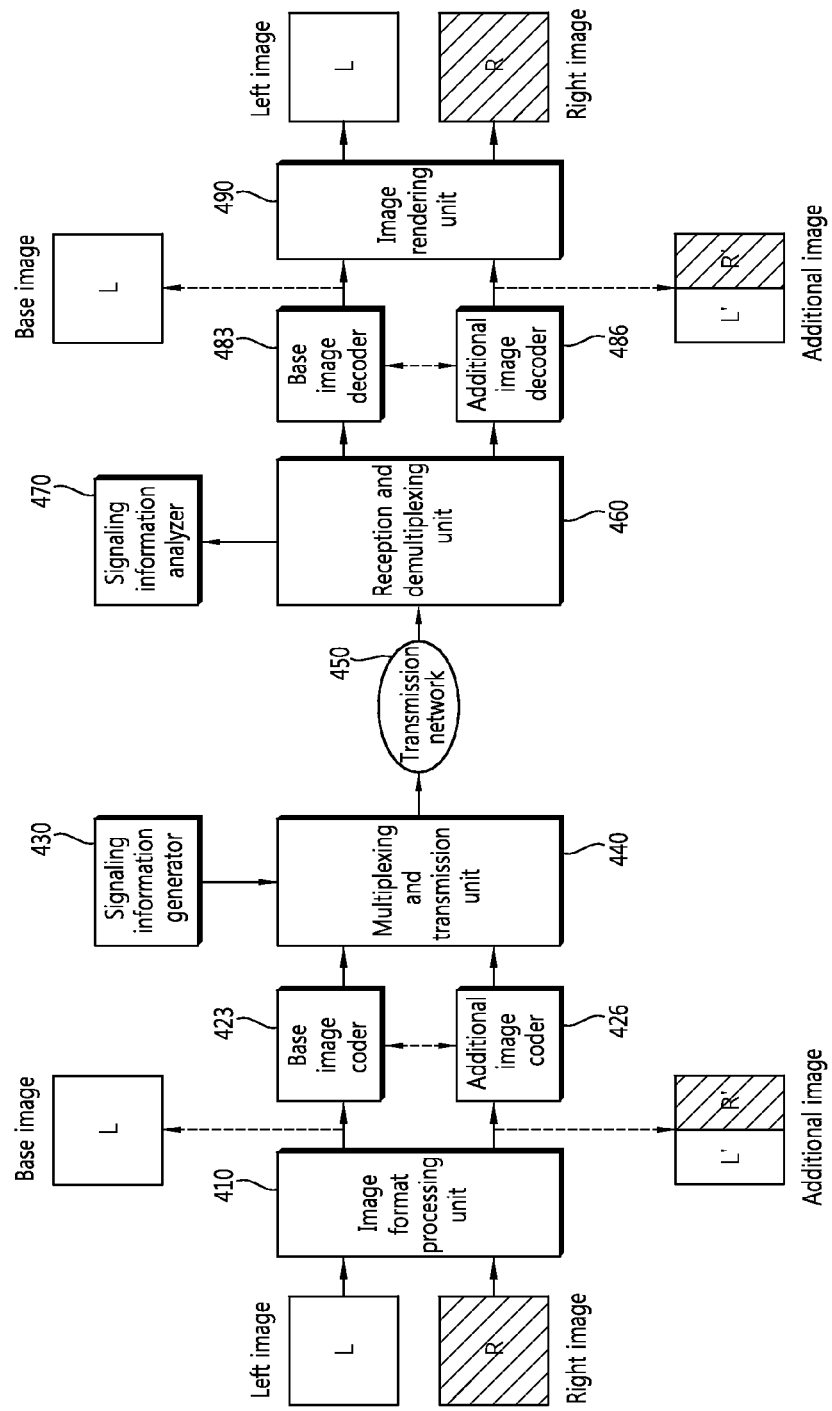
FIG. 4 is a block diagram schematically showing an embodiment of a 3DTV broadcasting system according to the present invention.

FIG. 4 is a block diagram schematically showing an embodiment of a 3DTV broadcasting system according to the present invention.

Referring to FIG. 4, the 3DTV broadcasting system according to the present invention may include a stereoscopic video transmission apparatus, a transmission network 450, and a stereoscopic video reception apparatus. The apparatus for transmitting stereoscopic video may include an image format processing unit 410, a base image coder 423, an additional image coder 426, a signaling information generator 430, and a multiplexing and transmission unit 440. The apparatus for receiving stereoscopic video may include a reception and demultiplexing unit 460, a signaling information analyzer 470, a base image decoder 483, an additional image decoder 486, and an image rendering unit 490.

The image format processing unit 410 may generate a base image and an additional image using an original left image L and an original right image R. Here, the image format processing unit 410 may configure the base image and the additional image in a stereo image format, such as that described in connection with the embodiment of FIG. 3. Furthermore, as described above, the additional image may have any one of various image formats used in a 3DTV broadcasting system based on the frame-compatible method. For example, the additional image may have the side-by-side format or the top-and-bottom format. FIG. 4 shows an embodiment in which the additional image has the side-by-side format.

The base image coder 423 may generate a base image stream by coding the base image using a coding method used in the existing 2D broadcasting. Here, the base image coder 423 may perform coding using the same method as the base image coder 210 of the service-compatible 3DTV broadcasting system shown in FIG. 2.

The additional image coder 426 may generate an additional image stream by coding the additional image. Here, the additional image coder 426 may independently code the additional image or may code the additional image through a mutual reference with the base image coder 423. That is, in the service-compatible 3DTV broadcasting system of FIG. 4, the base image and the additional image may be independently coded or may be coded through a mutual reference. In FIG. 4, a dotted line between the base image coder 423 and the additional image coder 426 may mean coding through a mutual reference.

In an image compression process, the additional image coder 426 may assign different bit rates to a reduced left image L' and a reduced right image R' which form an additional image. The reduced left image L' and the reduced right image R' may have different picture qualities, and a left image and a right image deduced from an additional image through a subsequent image rendering process may also have different picture qualities. For example, the additional image coder 426 may control bit rates assigned to a reduced left image L' and a reduced right image R' by controlling a quantization step (or the amount of a quantization parameter or both) applied to the reduced left image L' and the reduced right image R'. In other words, different quantization steps (or the amounts of a quantization parameter or both) may be applied to a reduced left image L' and a reduced right image R'. In this case, the reduced left image L' and the reduced right image R' may be coded at different bit rates.

For example, it is assumed that a base image is a left image and the image format of the additional image is the side-by-side format. In this case, the additional image coder 426 may assign a higher bit rate to a reduced right image R'. If a higher bit rate is assigned to the reduced right image R', a relatively low bit rate may be assigned to a reduced left image L' in order to maintain the total bit rate set in a system. In this case, a left image deduced from an additional image through a subsequent image rendering process may have a relatively lower picture quality than a right image. For another example, if a base image is a right image, the additional image coder 426 may assign a higher bit rate to a reduced left image L'. That is, the additional image coder 426 may code one image not corresponding to a base image, from among a reduced left image and a reduced right image, at a higher bit rate than the other image.

A method of assigning a bit rate is applied to support both service based on the service-compatible method and service based on the frame-compatible method and to provide 3D service of a high picture quality. The method of assigning a bit rate will be described in detail later.

The signaling information generator 430 may generate signaling information, including a type of 3DTV service, an image format of an additional image, and information about whether a base image is a left image or a right image. The signaling information may be defined in a signaling table, and the signaling information may be included in a bit stream through the multiplexing and transmission unit 440 and then transmitted to the stereoscopic video reception apparatus.

Here, the signaling table may mean a PAT of PSI, a PMT of PSI, VCT of PSIP, and/or an EIT of PSIP. For example, the signaling information included in the signaling table may be defined in the stream type stream_type and/or the descriptor of a PMT, may be defined in the stream type stream_type and/or the descriptor of a VCT, and may be defined in the descriptor of an EIT.

The signaling information may include stereoscopic service type information and image format type information. The stereoscopic service type information may mean information indicating a service type of stereoscopic video now being served. For example, the stereoscopic service type information may be indicated by stereoscopic_service_type. Furthermore, the image format type information may mean information indicating the image format of an additional image. For example, the additional image format type information may be indicated by stereo_video_format_type. Furthermore, in an embodiment, the stereoscopic service type information and the image format type information may be defined in a descriptor loop within a PMT.

As described above, the base image and the additional image may be composed of the same content or different pieces of content. Assuming that a base image is a left image L, if the base image and an additional image have the same content, an original left image corresponding to the reduced left image L' of the additional image may be identical with the original left image L of the base image. If the base image and the additional image have different pieces of content, an original left image corresponding to the reduced left image L' of the additional image may differ from the original left image L of the base image.

In an embodiment, if a base image and an additional image have the same content, the stereoscopic service type information may indicate service-compatible stereoscopic service. In this case, the image format of the additional image may be indicated by image format type information (e.g., stereo_video_format_type). For example, the image format type information may indicate a stereo side-by-side format or a stereo top-and-bottom format according to the image format of the additional image. Here, the image format type information (e.g., stereo_video_format_type) is not limited to a current MPEG-2 video stream unlike in the embodiment of FIG. 2, but may be applied to various types of coding streams.

In an embodiment, if a base image and an additional image have different pieces of content (i.e., a 2D program and a 3D program are separately written or provided), the stereoscopic service type information may indicate frame-compatible stereoscopic service. In this case, the image format of the additional image may also be indicated by the image format type information (e.g., stereo_video_format_type). The 2D program and the 3D program may be processed using the same method as that of the prior art.

The operation of the signaling information generator 430 other than the above description is the same as that of the signaling information generator 230 shown in FIG. 2, and thus a description thereof is omitted. Furthermore, the operations of the multiplexing and transmission unit 440, the transmission network 450, and the reception and demultiplexing unit 460 are the same as those of the embodiment of FIG. 2, and thus a description thereof is omitted.

The signaling information analyzer 470 may deduce signaling information from the bit stream received from the stereoscopic video transmission apparatus. A detailed embodiment of the signaling information has been described above, and thus a description thereof is omitted.

The base image decoder 483 may generate a base image by decoding the base image stream extracted from the bit stream. Furthermore, the additional image decoder 486 may generate an additional image by decoding the additional image stream extracted from the bit stream. If a user selects 3DTV broadcasting not 2D broadcasting, the base image decoder 483 and the additional image decoder 486 may be operated at the same time. Here, the additional image decoder 486 may perform decoding through a mutual reference with the base image decoder 483. That is, the base image decoder 483 and the additional image decoder 486 may be operated in a mutual-dependent manner. In FIG. 4, a dotted line between the base image decoder 483 and the additional image decoder 486 may mean decoding through a mutual reference.

As described above, the reduced left image L' and the reduced right image R' of the additional image may be compressed or coded at different bit rate. In this case, a part corresponding to the reduced left image L' a part corresponding to the reduced right image R' within the additional image stream may be decoded at different bit rates. Accordingly, in the decoded additional image, the reduced left image L' and the reduced right image R' may have different picture qualities.

The decoded base image and the decoded additional image may be provided to the image rendering unit 490. The image rendering unit 490 may generate a left image L and a right image R using the decoded base image or the decoded additional image or both. If the base image is a left image L, the left image L may correspond to a 2D image. The generated left image or the generated right image or both may be provided to a 2D display device or a 3D display device. A detailed operation of the image rendering unit 490 will be described later.

Figure 5:
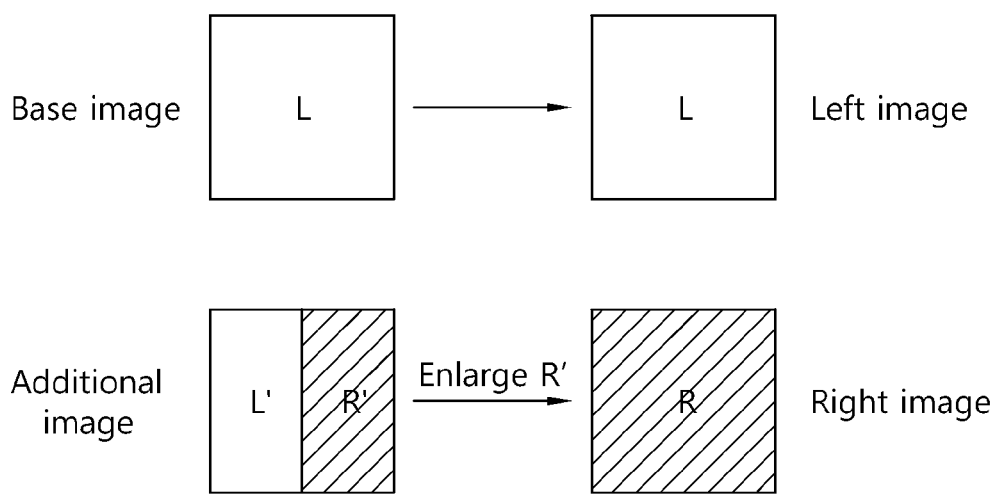
FIG. 5 is a conceptual diagram schematically illustrating an embodiment of the operation of an image rendering unit included in the 3DTV broadcasting system of FIG. 4.

FIG. 5 is a conceptual diagram schematically illustrating an embodiment of the operation of the image rendering unit 490 included in the 3DTV broadcasting system of FIG. 4. FIG. 5 may correspond to an embodiment when the 3DTV broadcasting system of FIG. 4 is applied to 3DTV based on the service-compatible method.

In FIG. 5, it is assumed that a base image is a left image L and an additional image is an image having the side-by-side format. It is also assumed that the reduced right image R' of the additional image has been coded and decoded at a higher bit rate than the reduced left image L' of the additional image. In this case, the reduced right image R' may have a higher picture quality than the reduced left image L'.

Referring to FIG. 5, the image rendering unit 490 may obtain or generate the left image L of an original size by using the base image. Furthermore, the image rendering unit 490 may generate an image of an original size by enlarging only a ½ image coded at a higher bit rate (i.e., a higher picture quality), from among the reduced right image R' and the reduced left image L' forming the additional image.

In the embodiment of FIG. 5, the reduced right image R' may be coded at a higher bit rate because the base image is the left image L. In this case, the image rendering unit 490 may generate the right image R of an original size by enlarging the reduced right image R' because the reduced right image R' has a higher picture quality. The right image R of an original size is generated from the reduced right image R' that has a relatively higher picture quality than the reduced left image L'. Thus, if a 3D image is composed of the left image L of an original size and the right image R of an original size, the 3D image having a high picture quality can be played.

Meanwhile, most of digital broadcasting including the Advanced Television Systems Committee (ATSC) suggests a basic requirement that the existing DTV broadcasting maintain a high picture quality. Accordingly, a base image (e.g., a left image, L) can maintain a high picture quality because a higher bit rate is assigned to the base image used for limited 2D broadcasting. Furthermore, in the above embodiment, an image (e.g., a right image, R) of an original size can be generated by using an image of a relatively high picture quality, from among a reduced right image R' and a reduced left image L' that form an additional image. Accordingly, if a 3D image is composed of a left image and a right image deduced using the above method, 3DTV broadcasting of a high picture quality may be provided.

Although a left image L has been illustrated as being a base image in the above-described embodiment, the present invention may also be applied to an example in which a base image is a right image R. For example, if a base image is a right image R, a reduced left image L', from among a reduced right image R' and the reduced left image L' that form an additional image, may be coded at a higher bit rate. In this case, the image rendering unit 490 may generate the right image R of an original size by using the base image and may generate a left image L of an original size by using the reduced left image L' of the additional image. Here, if a 3D program is composed of the right image R of an original size and the left image L of an original size deduced using the above method, 3DTV broadcasting of a high picture quality may be provided because the reduced left image L' has a relatively higher picture quality than the reduced right image R'.

Figure 6:
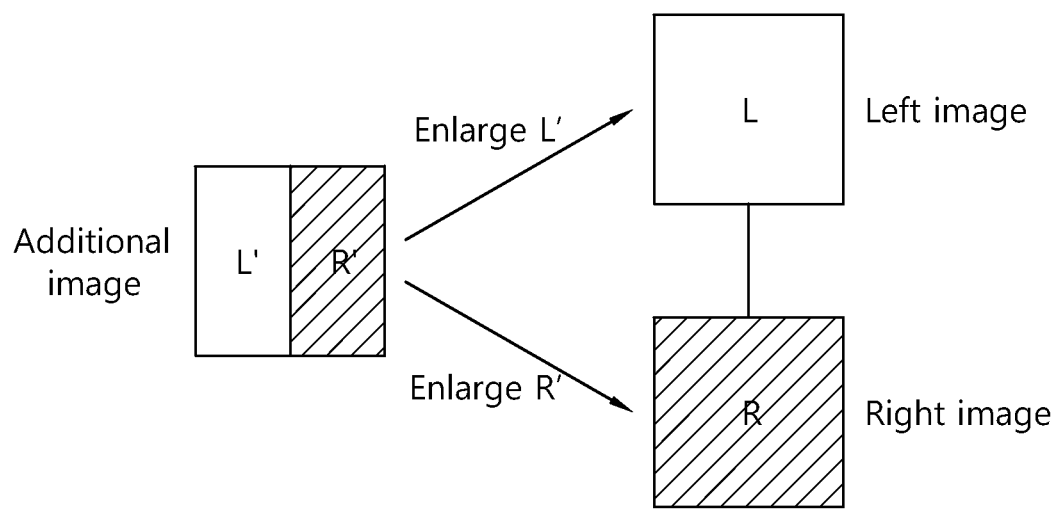
FIG. 6 is a conceptual diagram schematically illustrating another embodiment of the operation of the image rendering unit included in the 3DTV broadcasting system of FIG. 4.

FIG. 6 is a conceptual diagram schematically illustrating another embodiment of the operation of the image rendering unit 490 included in the 3DTV broadcasting system of FIG. 4. In FIG. 6, it is assumed that an additional image has the side-by-side format.

Even when a frame-compatible 3DTV receiver supporting only service based on the frame-compatible method is used, the 3DTV broadcasting system of FIG. 4 may provide basic 3DTV service. To this end, in the 3DTV broadcasting system of FIG. 4, when the reception and demultiplexing unit 460 extracts an additional image stream and the additional image decoder 486 decodes the additional image stream, an additional image may be generated.

Referring to FIG. 6, if a frame-compatible 3DTV receiver is used, the image rendering unit 490 may generate a left image L of an original size and a right image R of an original size by using an additional image. That is, the image rendering unit 490 may generate the left image L of an original size by twice enlarging a reduced left image L' and generate the right image R of an original size by twice enlarging a reduced right image R'. When the generated left image L of an original size and the generated right image R of an original size are provided to a 3D display device, a 3D image may be played in the 3D display device. Accordingly, the 3DTV broadcasting system of FIG. 4 may be applied to not only service-compatible 3DTV based on the dual stream method, but also frame-compatible 3DTV.

Meanwhile, the reduced left image L' and the reduced right image R' that form the additional image as described above may be coded at different bit rates. Here, the enlarged left image L of an original size and the enlarged right image R of an original size may have different picture qualities. A human being does not notice some difference in the picture quality of the left image L and the right image R. Thus, the 3DTV broadcasting system of FIG. 4 may provide available 3D broadcasting service even when frame-compatible 3DTV is used.

Figure 7:
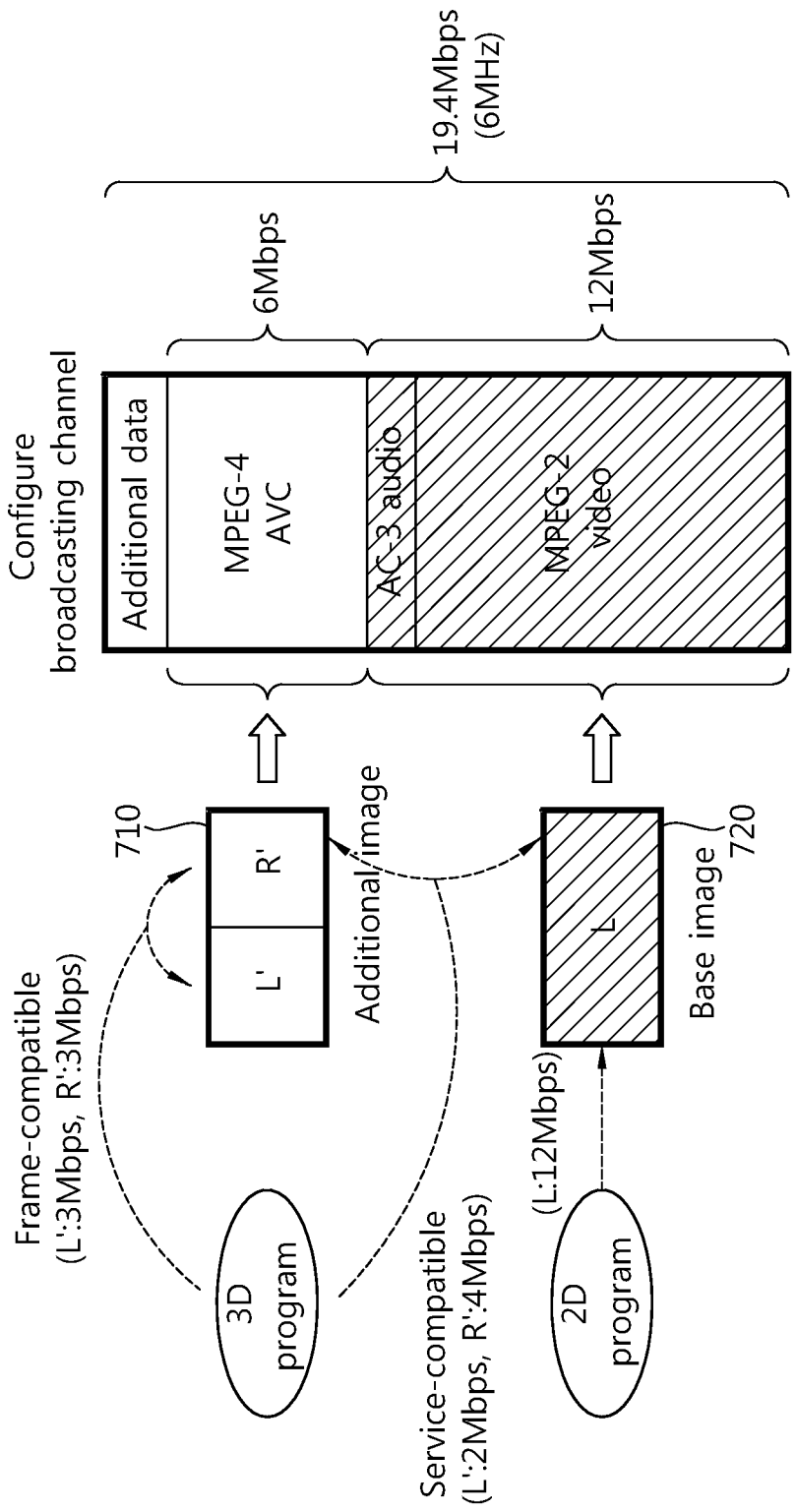
FIG. 7 is a conceptual diagram schematically illustrating an embodiment of a method of configuring a program and a channel according to the present invention.

FIG. 7 is a conceptual diagram schematically illustrating an embodiment of a method of configuring a program and a channel according to the present invention. In the embodiment of FIG. 7, it is assumed that a base image is a left image L and an additional image has the side-by-side format. The method of FIG. 7 may correspond to a method of configuring a program and a channel based on, for example, ATSC.

Referring to FIG. 7, a 2D program having compatibility with the existing 2D DTV broadcasting may be configured using a base image. In an embodiment, the 3DTV broadcasting system according to the present invention may configure a 2D program by compressing a base image at a bit rate of 12 Mbps using MPEG-2 video.

Meanwhile, as described above, the 3DTV broadcasting system according to the present invention may be applied both to a 3D program based on the service-compatible method and a 3D program based on the frame-compatible method. The 3D program based on the service-compatible method and the 3D program based on the frame-compatible method may be configured according to different methods.

If the service-compatible method is used, the 3DTV broadcasting system according to the present invention may assign a relatively higher bit rate to a reduced right image R', from among images forming an additional image. For example, a total bit rate of 6 Mbps may be maintained by assigning a bit rate of 2 Mbps to a reduced left image L' and a bit rate of 4 Mbps to a reduced right image R'. Furthermore, in an embodiment, a reduced left image L' and a reduced right image R' may be compressed using MPEG-4 AVC. Here, a 3D program may be configured on the basis of the coded streams of the left image L (i.e., a base image) and the reduced right image R' of the additional image. In this case, a 3D program of a high picture quality may be provided because the left image L (i.e., a base image) and the reduced right image R' of the additional image may maintain a relatively high bit rate.

If the frame-compatible method is used, the 3DTV broadcasting system according to the present invention may compress the reduced right image R' and the reduced left image L' of an additional image by assigning the same bit rate to the reduced right image R' and the reduced left image L'. Here, a 3D program may be configured on the basis of the coded streams of the reduced right image R' and the reduced left image L' of the additional image. If the frame-compatible method is used, a base image and an additional image may be composed of different pieces of content, and a 3D program may be provided using only the additional image.

The bit rates assigned to the base image and the additional image are not limited to the embodiments. The bit rates assigned to the base image and the additional image may be changed, and a rate of bit rates assigned to the reduced left image and the reduced right image of an additional image may also be changed according to implementations or as occasion demands or both.

In the above-described embodiments, a transport bit stream that is actually transmitted through a broadcasting channel may be generated by multiplexing a dual stream including a base image stream and an additional image stream. Here, the base image stream may be generated by coding a base image, and the additional image stream may be generated by coding an additional image. Furthermore, a method of configuring a 2D program or a 3D program or both may be logically determined in a high level based on table information or signaling information or both which are included in a signaling table. Here, the signaling table may include a VCT of PSIP, a PAT of PSI, and/or a PMT of PSI.

The 2D program and the 3D program may be assigned to respective virtual channels. Furthermore, the 2D program and 3D program may be constructed into a single virtual channel. A method of configuring the virtual channel may vary depending on service requirements.

Meanwhile, although a left image L has been illustrated as being a base image in the above-described embodiment, the present invention may also be applied to an example in which a base image is a right image R. For example, if a base image is a right image R in a 3D program based on the service-compatible method, the 3DTV broadcasting system according to the present invention may assign a relatively high bit rate to a reduced left image L', from among images that form an additional image. Here, a 3D program may be on the basis of the coded streams of the right image R (i.e., the base image) and the reduced left image L' of the additional image. In this case, the 3D program having a high picture quality may be provided because the right image R (i.e., the base image) and the reduced left image L' of the additional image can maintain a relatively high bit rate.

Figure 8:
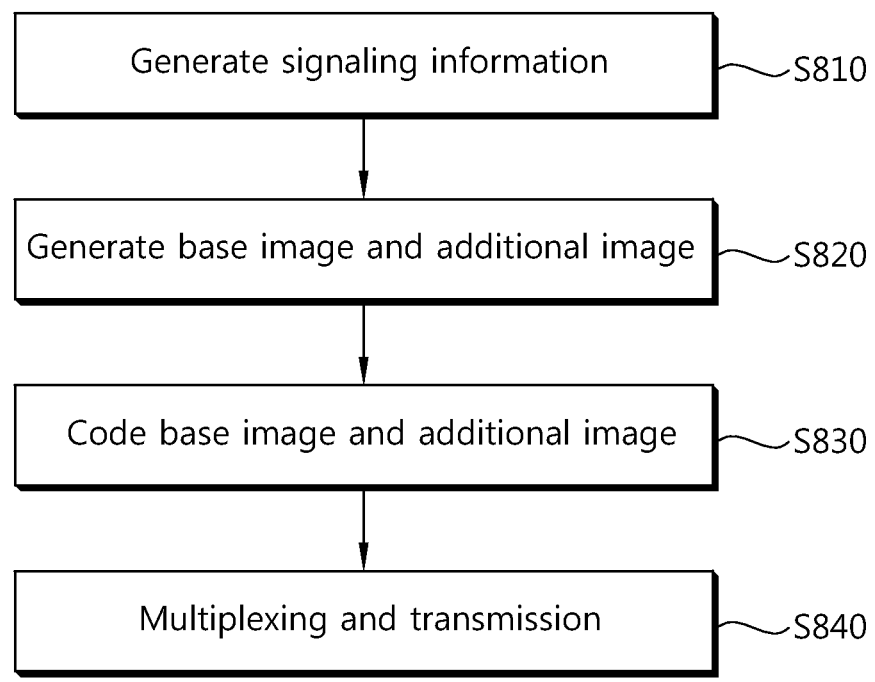
FIG. 8 is a flowchart schematically illustrating an embodiment of a method of transmitting stereoscopic video according to the present invention.

FIG. 8 is a flowchart schematically illustrating an embodiment of a method of transmitting stereoscopic video according to the present invention.

Referring to FIG. 8, the stereoscopic video transmission apparatus may generate signaling information at step S810.

The signaling information includes information, including a type of 3DTV service, an image format of an additional image, and information about whether a base image is a left image or a right image. A detailed embodiment of the signaling information has been described above, and thus a description thereof is omitted.

Referring to FIG. 8, the stereoscopic video transmission apparatus may generate a base image and an additional image by using an original left image L and an original right image R at step S820. As described above, the additional image may have one of various image formats used in the 3DTV broadcasting system based on the frame-compatible method. The additional image may have the side-by-side format or the top-and-bottom format, for example.

The apparatus for transmitting stereoscopic video may generate a base image stream and an additional image stream by coding the generated base image and the generated additional image at step S830. Here, the base image and the additional image may be independently coded or may be coded through a mutual reference. Furthermore, the reduced left image L' and the reduced right image R' of the additional image may be coded at different bit rates. A detailed embodiment in which the reduced left image L' and the reduced right image R' are coded has been described above, and thus a detailed description thereof is omitted.

Next, the stereoscopic video transmission apparatus may generate a single stream by multiplexing the base image stream and the additional image stream. The single stream may be subject to processes, such as channel coding and modulation, and then transmitted to the stereoscopic video reception apparatus in the form of a bit stream at step S840. At this time, the generated signaling information may be included in the bit stream and then transmitted to the stereoscopic video reception apparatus.

Figure 9:
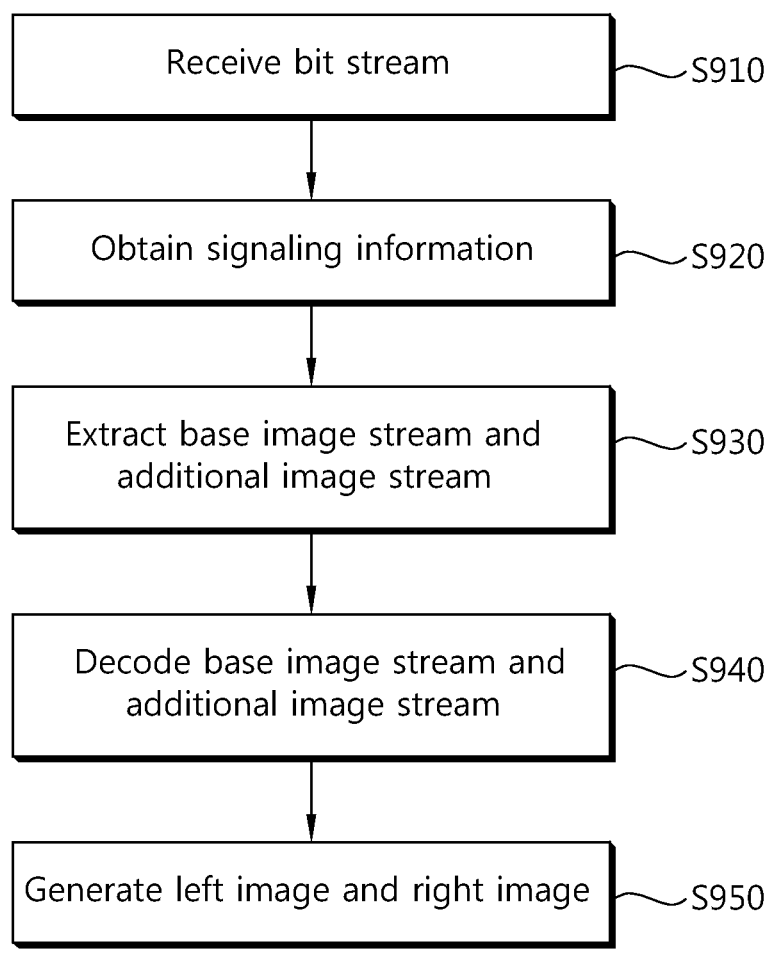
FIG. 9 is a flowchart schematically illustrating an embodiment of a method of receiving stereoscopic video according to the present invention.

FIG. 9 is a flowchart schematically illustrating an embodiment of a method of receiving stereoscopic video according to the present invention.

Referring to FIG. 9, the stereoscopic video reception apparatus may receive a bit stream from the stereoscopic video transmission apparatus at step S910.

When the bit stream is received, the stereoscopic video reception apparatus may deduce signaling information from the received bit stream at step S920. A detailed embodiment of the signaling information has been described above, and thus a detailed description thereof is omitted.

Furthermore, the stereoscopic video reception apparatus may extract a base image stream and an additional image stream by performing processes, such as demodulation, channel decoding, and demultiplexing, for the received bit stream at step S930.

The stereoscopic video reception apparatus may generate a base image and an additional image by decoding the base image stream and the additional image stream at step S940. Here, the base image and the additional image may be independently decoded or may be decoded through a mutual reference. Furthermore, as described above, a part corresponding to a reduced left image L' within the additional image stream and a part corresponding to a reduced right image R' within the additional image stream may be decoded at different bit rates.

After the base image and the additional image are generated, the stereoscopic video reception apparatus may generate a left image L and a right image R by using the generated base image or the generated additional image or both at step S950. For example, the deduced signaling information may be used to generate the left image and the right image. The generated left image or the generated right image may be provided to a 2D display device or a 3D display device. A detailed embodiment of a method of generating the left image and the right image has been described above, and thus a detailed description thereof is omitted.

In accordance with the above-described embodiments, the present invention may provide not only an original image, such as an original left image or an original right image, but also conventional stereoscopic image content having an image format, such as the side-by-side format or the top-and-bottom format, by using the service-compatible 3DTV broadcasting system based on the dual stream method. Accordingly, the 3DTV broadcasting system according to the present invention may basically provide 2D service to the existing DTV, provide basic 3D service to 3DTV based on the frame-compatible method to which image formats, such as the side-by-side format and the top-and-bottom format, are applied, and provide 3D service of a high picture quality to service-compatible 3DTV based on the dual stream method at the same time.

In the above-described embodiments, although the methods have been described on the basis of the flowcharts using a series of the steps or blocks, the present invention is not limited to the above sequence of the steps, and some of the steps may be performed at different sequences from the remaining steps or may be performed simultaneously with the remaining steps. Furthermore, those skilled in the art will understand that the steps shown in the flowcharts are not exclusive and other steps may be included or one or more steps of the flowcharts may be deleted without affecting the scope of the present invention.

The above-described embodiments include various aspects of examples. Although all kinds of possible combinations for representing the various aspects may not be described, a person having ordinary skill in the art will understand that other possible combinations are possible. Accordingly, the present invention should be construed to include all other alternations, modifications, and changes which fall within the scope of the claims.

In accordance with the method of transmitting stereoscopic video according to the present invention, 2D/3D broadcasting service efficiency may be improved.

In accordance with the method of receiving stereoscopic video according to the present invention, 2D/3D broadcasting service efficiency may be improved.

In accordance with the method of providing stereoscopic video according to the present invention, 2D/3D broadcasting service efficiency may be improved.

What is claimed is:

1. A method of transmitting stereoscopic video, comprising:
   generating a base image and an additional image, the base image being one of a left image and a right image, the additional image including a reduced left image corresponding to the left image and a reduced right image corresponding to the right image and having predetermined image format comprising one of a side-by-side format and a top-and-bottom format;
   generating a base image stream, corresponding to the base image, and an additional image stream, corresponding to the additional image, by coding the base image and the additional image, respectively;
   generating single stream information by multiplexing the base image stream and the additional image stream; and
   transmitting image information including the single stream information,
   wherein a stereoscopic service includes at least one of a first service and a second service, wherein the first service allows the stereoscopic video to be generated using both the base image and the one reduced image not corresponding to the base image, wherein the second service allows the stereoscopic video to be generated using both the reduced left image and the reduced right image of the additional image.

2. The method as claimed in claim 1, wherein generating the base image stream corresponding to the base image and the additional image stream corresponding to the additional image comprises coding the reduced left image and the reduced right image at different bit rates.

3. The method as claimed in claim 2, wherein:

if a service type of the stereoscopic video is the second service comprising a service-compatible service, generating the base image stream corresponding to the base image and the additional image stream corresponding to the additional image comprises coding one reduced image not corresponding to the base image, from among the reduced left image and the reduced right image, at a higher bit rate than the other reduced image.

4. The method as claimed in claim 1, wherein if a service type of the stereoscopic video is the second service comprising a frame-compatible service, the base image and the additional image have different content.

5. The method as claimed in claim 1, further comprising generating signaling information, including at least one of stereoscopic service type information indicating a service type of the stereoscopic video, image format type information indicating an image format type of the additional image, and information indicating whether the base image is the left image or the right image, wherein the image information further comprises the signaling information.

6. An apparatus for transmitting stereoscopic video, comprising:

an image format processor to generate a base image and an additional image, the base image being one of a left image and a right image, the additional image including a reduced left image corresponding to the left image and a reduced right image corresponding to the right image and having predetermined image format comprising one of a side-by-side format and a top-and-bottom format;

a coder to generate a base image stream, corresponding to the base image, and an additional image stream, corresponding to the additional image, by coding the base image and the additional image, respectively;

a multiplexer to generate single stream information by multiplexing the base image stream and the additional image stream; and a transmitter to transmit image information including the single stream information, wherein a stereoscopic service includes at least one of a first service and a second service, wherein the first service allows the stereoscopic video to be generated using both the base image and the one reduced image not corresponding to the base image, wherein the second service allows the stereoscopic video to be generated using both the reduced left image and the reduced right image of the additional image.

7. A method of receiving stereoscopic video, comprising:

receiving a bit stream including image information;

extracting a base image stream and an additional image stream from the bit stream;

generating a base image and an additional image by decoding the base image stream and the additional image stream, respectively, the base image being one of a left image and a right image, the additional image including a reduced left image corresponding to the left image and a reduced right image corresponding to the right image and having predetermined image format comprising one of a side-by-side format and a top-and-bottom format;

when a first service is utilized, generating the stereoscopic video using the base image and one of the left and right reduced images not corresponding to the base image; and when a second service is utilized, generating the stereoscopic video using the left reduced image and the right reduced image of the additional image.

8. The method as claimed in claim 7, wherein:

the additional image stream includes a first partial stream corresponding to the reduced left image and a second partial stream corresponding to the reduced right image, and generating the base image and the additional image comprises decoding the first partial stream and the second partial stream at different bit rates.

9. The method as claimed in claim 8, wherein:

if a service type of the stereoscopic video is the first service comprising a service-compatible service, generating the base image and the additional image comprises decoding a partial stream not corresponding to the base image, from among the first partial stream and the second partial stream, at a higher bit rate than the other partial stream.

10. The method as claimed in claim 9, wherein generating the the stereoscopic video comprises generating the left image using the base image and generating the right image by enlarging the reduced right image, if the base image is the left image.

11. The method as claimed in claim 9, wherein generating the the stereoscopic video comprises generating the right image using the base image and generating the left image by enlarging the reduced left image, if the base image is the right image.

12. The method as claimed in claim 7, wherein if a service type of the stereoscopic video is the second service comprising a frame-compatible service, generating the left image and the right image comprises generating the left image by enlarging the reduced left image and generating the right image by enlarging the reduced right image.

13. The method as claimed in claim 12, wherein the base image and the additional image have different content.

14. The method as claimed in claim 7, wherein further comprising obtaining signaling information, including at least one of stereoscopic service type information indicating a service type of the stereoscopic video, image format type information indicating an image format type of the additional image, and information indicating whether the base image is the left image or the right image, from the bit stream, wherein the image information further comprises the signaling information.

15. An apparatus for receiving stereoscopic video, comprising:

a receiver to receive a bit stream including image information;

a demultiplexer to extract a base image stream and an additional image stream from the bit stream;

a decoder to generate a base image and an additional image by decoding the base image stream and the additional image stream, respectively, the base image being one of a left image and a right image, the additional image including a reduced left image corresponding to the left image and a reduced right image corresponding to the right image and having predetermined image format comprising one of a side-by-side format and a top-and-bottom format; and an image renderer to:
generate the stereoscopic video using the base image and one of the left and right reduced images not corresponding to the base image, when a first service is utilized; and
generate the stereoscopic video using the left reduced image and the right reduced image of the additional image, when a second service is utilized.

16. The method of claim 7, further comprising:
when 2D service is utilized, generating 2D video using one of the left image and the right image obtained from the base image.

* * * * *